(12) United States Patent
Recchia (10) Patent No.: US 11,383,418 B2
(45) Date of Patent: Jul. 12, 2022

(54) BLADDER MANUFACTURING PROCESS

(71) Applicant: AVIOREC S.R.L., Anagni (IT)

(72) Inventor: Jacopo Recchia, Anagni (IT)

(73) Assignee: AVIOREC S.R.L., Anagni (IT)

( * ) Notice: Subject to any disclaimer, the term of this patent is extended or adjusted under 35 U.S.C. 154(b) by 260 days.

(21) Appl. No.: 16/499,503

(22) PCT Filed: Apr. 4, 2017

(86) PCT No.: PCT/IT2017/000065
§ 371 (c)(1),
(2) Date: Sep. 30, 2019

(87) PCT Pub. No.: WO2018/185792
PCT Pub. Date: Oct. 11, 2018

(65) Prior Publication Data
US 2020/0238586 A1    Jul. 30, 2020

(51) Int. Cl.
*B29C 48/88* (2019.01)
*B29C 48/91* (2019.01)
*B29C 48/09* (2019.01)
*B29C 48/12* (2019.01)

(52) U.S. Cl.
CPC .......... *B29C 48/9115* (2019.02); *B29C 48/09* (2019.02); *B29C 48/12* (2019.02); *B29C 48/9105* (2019.02)

(58) Field of Classification Search
CPC .. B29C 48/9115; B29C 48/9105; B29C 48/12
See application file for complete search history.

(56) References Cited

U.S. PATENT DOCUMENTS

| 3,988,189 | A |   | 10/1976 | Sullivan |
| 4,257,630 | A | * | 3/1981 | Bartell .............. B29C 66/72141 |
|  |  |  |  | 285/21.2 |
| 4,303,102 | A | * | 12/1981 | Hugley ................ B29D 23/001 |
|  |  |  |  | 138/89 |
| 4,444,700 | A |   | 4/1984 | Fondren |
| 2015/0099079 | A1 |   | 4/2015 | Letailleur |
| 2017/0334095 | A1 | * | 11/2017 | Harshberger ......... B29C 33/405 |

FOREIGN PATENT DOCUMENTS

WO   WO-2018185792 A1   10/2018

OTHER PUBLICATIONS

International Search Report and Written Opinion dated Jan. 15, 2018, in International Application No. PCT/IT201700065, European Patent Office, Netherlands, 30 pages.
International Preliminary Report on Patentability dated Jul. 29, 2019, in International Application No. PCT/IT201700065, European Patent Office, Netherlands, 15 pages.

* cited by examiner

*Primary Examiner* — Galen H Hauth
(74) *Attorney, Agent, or Firm* — Sterne, Kessler, Goldstein & Fox P.L.L.C.

(57) ABSTRACT

The present invention relates to a process for manufacturing the so-called "bladders", that is generally tubular elements made of rubber, which can be inflated and used as compacting tools in the processed for curing composites, allowing to distribute homogeneously, on the surface in contact to the portion to be cured, the pressure obtained by inletting air or other gas inside thereof.

24 Claims, 6 Drawing Sheets

APM

BLADDER MANUFACTURING PROCESS

The present invention relates to a process for manufacturing the so-called "bladders".

BACKGROUND

A bladder is a generally tubular element made of rubber, which can be inflated and used as compacting tool in the process for curing composite materials, allowing to distribute homogeneously, on the surface in contact with the portion to be cured, the pressure obtained by inletting air or other gas inside thereof.

Usually it is implemented in the shape of a profile made of rubber with constant section and considerably higher length than the section of the profile itself.

The need is particularly felt to have available tubular elements (bladders) which, in order to fulfil effectively the technical object thereof, have well defined features and performances.

In particular, one wishes that—in use—they are characterized by a vacuum loss not higher than:
- 3.80 millimetres of mercury in 20 minutes if pressurized at 27 mbar;
- 7.6 millimetres of mercury in 20 minutes if pressurized at 250 mbar.

The bladder should further guarantee a minimum of 25 cycles in autoclave.

TECHNICAL PROBLEM SOLVED BY THE INVENTION

The object of the present invention is then to solve the problems of known art, through a production process as defined in claim 1.

Additional features of the present invention are defined in the corresponding depending claims.

Additional object of the present invention is a tubular element obtained by the process of the present invention.

The advantages, together with the features and use modes of the present invention, will result evident from the following detailed description of preferred embodiments thereof, shown by way of example and not for limitative purpose.

BRIEF DESCRIPTION OF THE DRAWINGS

The drawings shown in the enclosed figures will be referred to, wherein:

FIGS. 1 to 3 show a tubular element according to the present invention; in particular, FIG. 1 represents a top plan view thereof, therefrom the ratio between the longitudinal (L) and transversal (T) sizes of the element itself can be deduced;

DETAILED DESCRIPTION OF POSSIBLE EMBODIMENTS OF THE INVENTION

The present invention will be described hereinafter by referring to the above-mentioned figures.

The process for manufacturing a tubular element (bladder) according to the present invention will be described hereinafter.

In the process it is possible to detect and define some main macrosteps constituting it.

In particular, the production of the tubular element according to the present invention takes place continuously by means of a cold extrusion process. Generally, then, the process comprises the following steps:
- supplying a rubber compound to an extruder;
- forming a tubular element by means of a die; and
- vulcanization of the tubular element formed in a vulcanization tunnel.

Preferably, the compound used for implementing the bladder has a MDS formulation as shown in the following Table 1.

TABLE 1

| CAS n° | % |
| --- | --- |
| 63394-02-5 | 85-95 |
| 14808-60-7 | 3-6 |
| miscellaneous | 3-6 |

A commercial example of a compound of this type is the compound produced and commercialized by MESGO s.p.a. with the abbreviation MG3899N75P.

For the steps of forming and vulcanizing the rubber profile a plant (line) for extruding profiles made of silicone can be preferably used.

Figure 1:
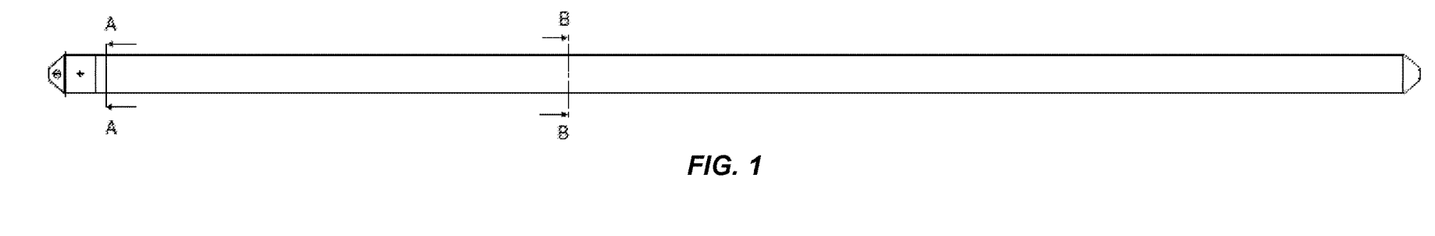
Figure 2A:
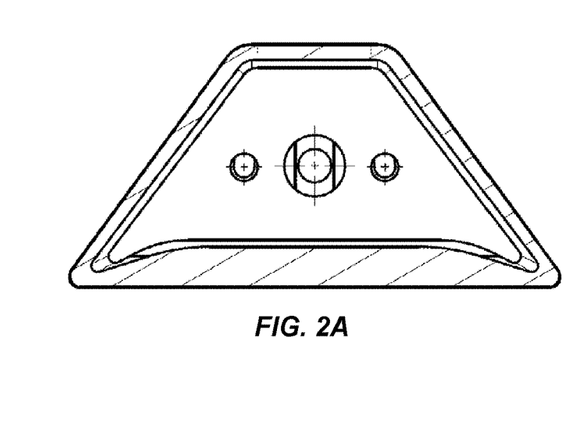
Figure 2B:
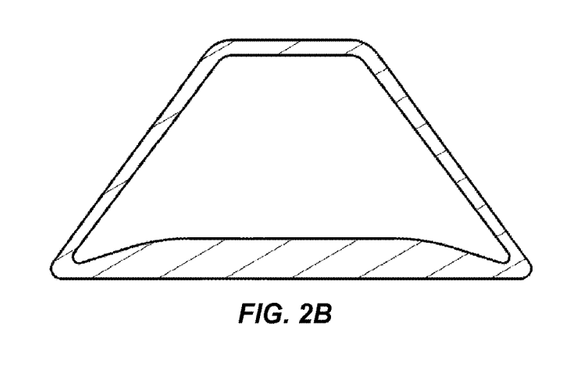
Figure 3:
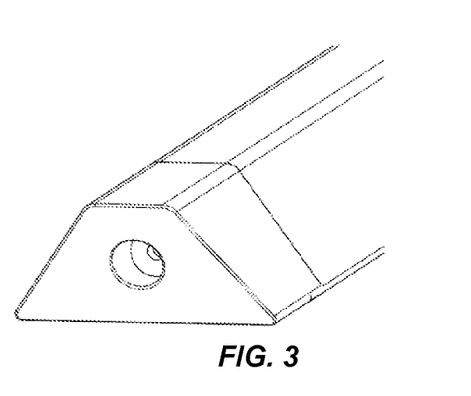
Figure 4:
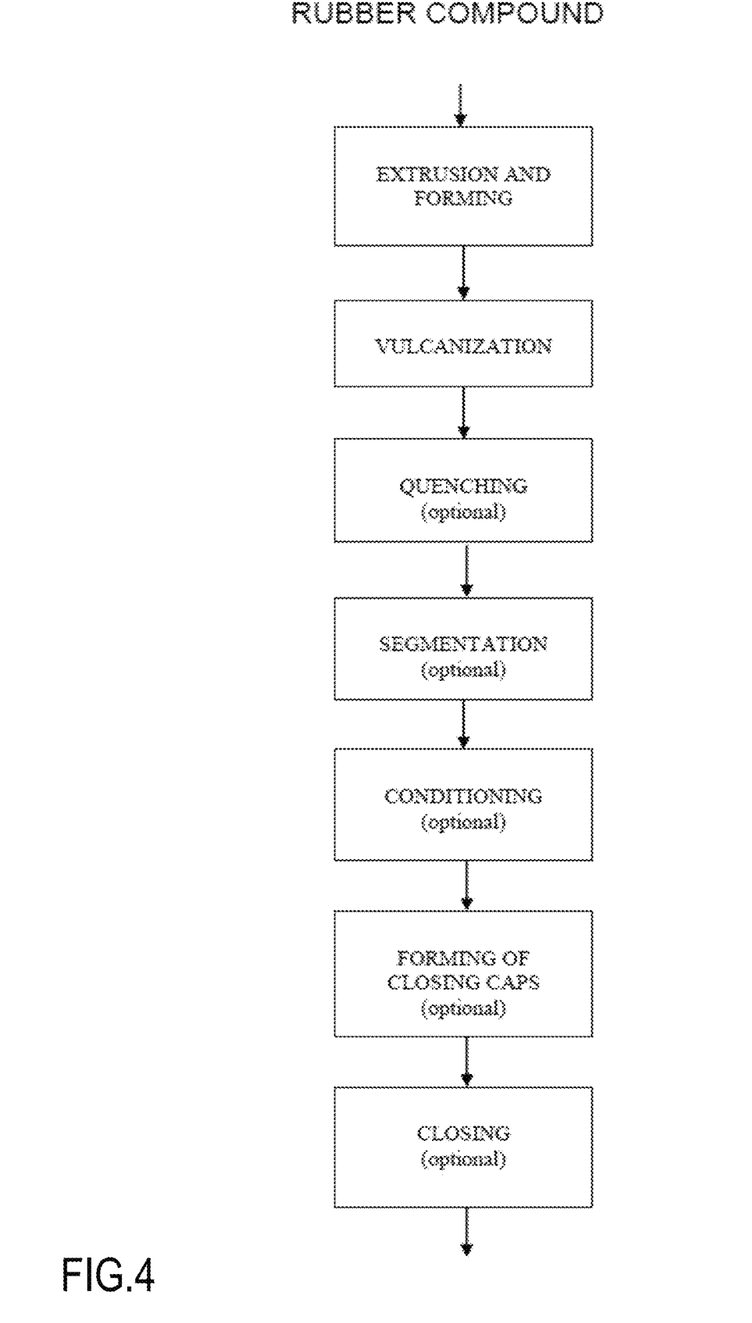
FIG. 4 is a flowchart schematizing the main steps of a process according to the invention.
Figure 5:
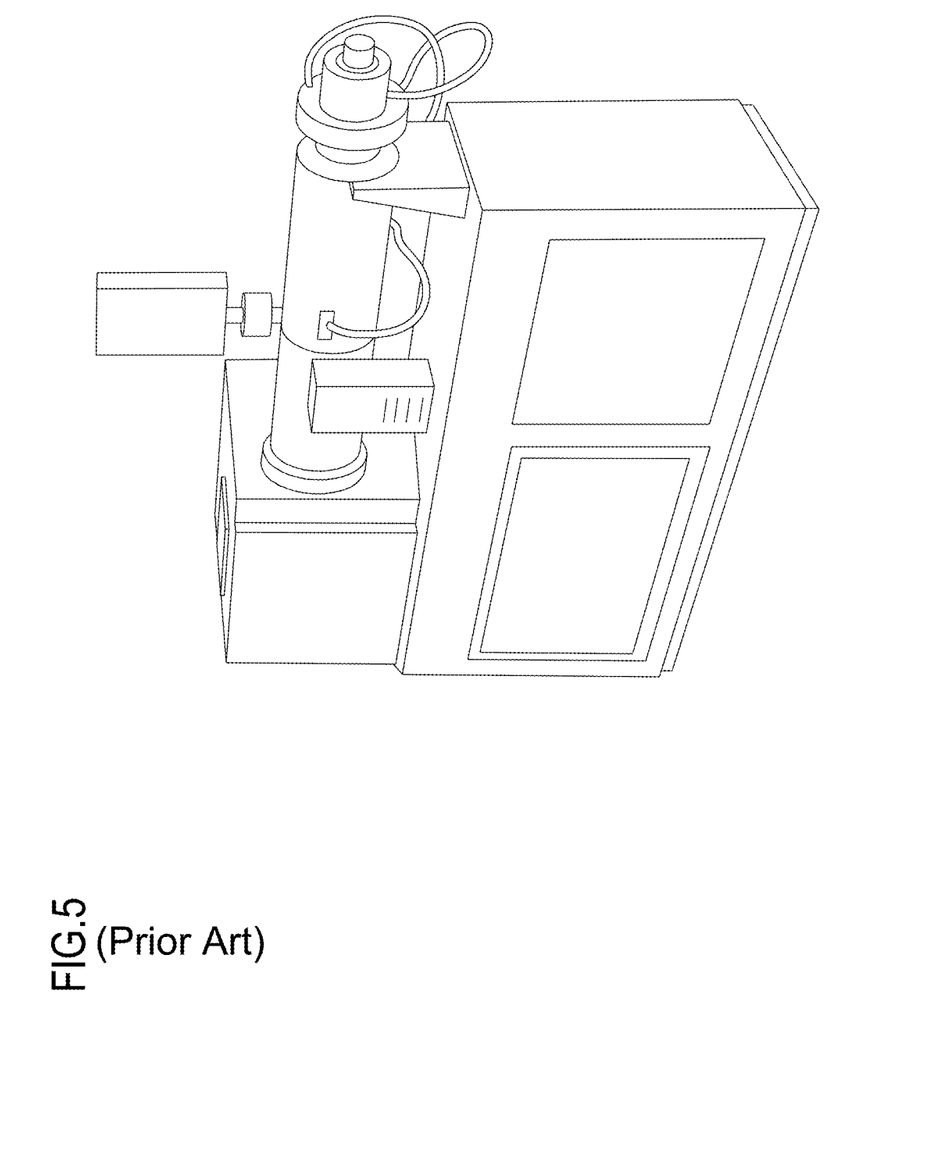
FIG. 5 is an extruder which can be used for the production of the tubular element according to the present invention.

The extruder type can be for example of the type described in Table 2 and illustrated by way of example in FIG. 5.

TABLE 2

| MOD SIZE | SIZE | L/D | POWER kW | OUTPUT kg/h |
| --- | --- | --- | --- | --- |
| TGS | 90 | 12/1-16/1 | 37 | 70 ÷ 200 |

The forming downstream of the extruder takes place by using dies made of steel, preferably implemented by means of a wire electroerosion process.

Figure 6:
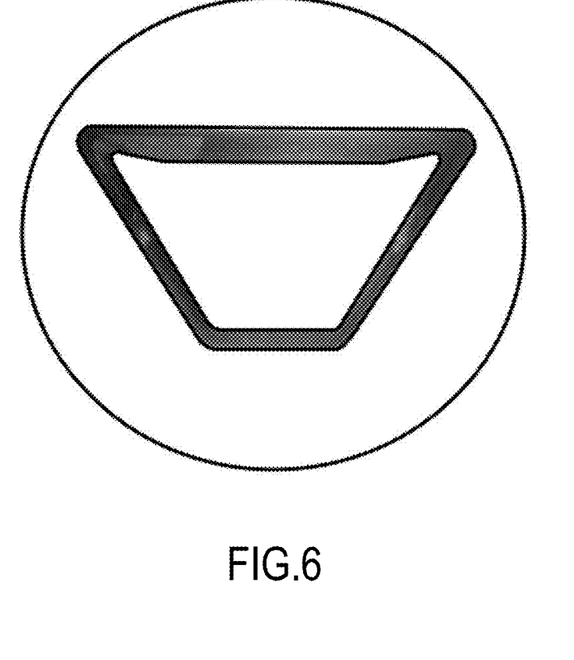
FIG. 6 is a view of the front side of an extrusion die for a general tubular element, with trapezoidal section, according to the present invention.

According to a preferred embodiment, the extruder is capable of receiving dies with disc having diameter of 100 mm (FIG. 6).

According to an embodiment, the forming of the rubber profile takes place according to the following specifications:
- thrusting pressure in the extruder comprised between 5 and 50 bar;
- compound temperature in the extruder comprised between 0 and 50° C.; and
- distance between extruder die and inlet of the vulcanization tunnel comprised between 10 and 50 mm.

According to a possible embodiment, the thrusting pressure in the extruder is comprised between 15 and 35 bar, still more preferably between 20 and 25.

According to a possible embodiment, the compound temperature in the extruder is comprised between 10 and 35° C., still more preferably between 20 and 30° C.

Downstream of the extruder there is a vulcanization tunnel comprising an oven with length equal to about 10 m and equipped with a conveyor belt made of steel.

In such step the profile made of rubber vulcanizes by reaching the state of "cured profile".

Figure 7:
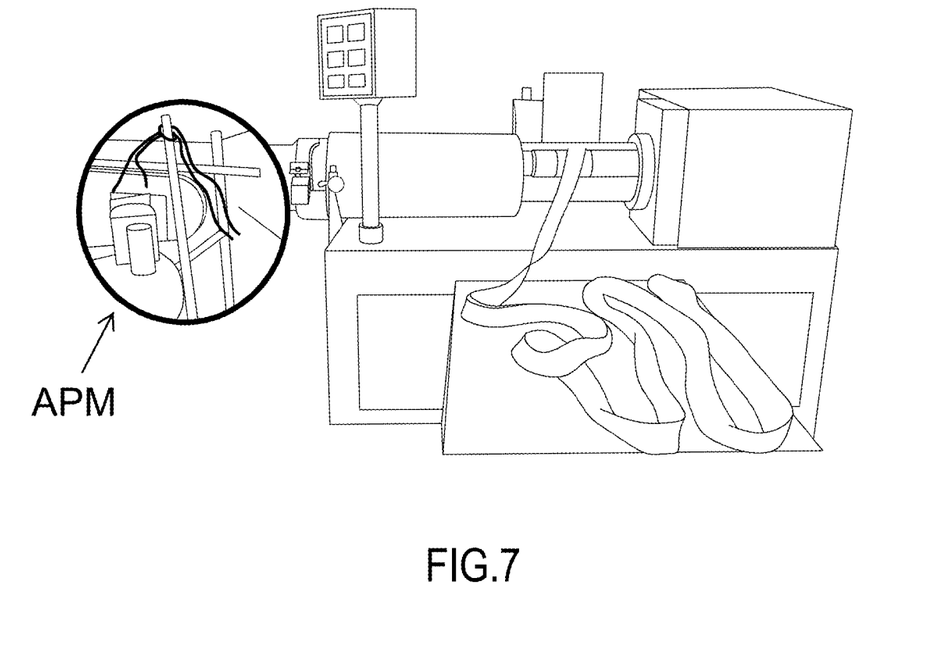
FIG. 7 shows, by way of example, an extrusion plant in the step of manufacturing the rubber profile of the bladder, wherein a powdering station is highlighted.

In the space lying between the opening of the extruder (die outlet) and the inlet of the vulcanization tunnel, the profile surface which will rest upon the conveyor belt made of steel, preferably is sprayed with talcum, for example by means of an automatic powdering machine APM. This prevents air bubbles from creating on the face of the profile in contact with the conveyor belt made of steel, FIG. 7.

By meeting the technical specifications of the compound, during the passage inside the vulcanization tunnel, it is advantageous that the profile reaches a temperature equal to about 140° C. and keeps it for about 10 minutes, to vulcanize correctly.

To this purpose, the vulcanization step preferably takes place according to the following specifications:
  speed for passing in the vulcanization tunnel comprised between 0.5 and 2 m/min, more preferably comprised between 0.5 and 1 m/min;
  temperature in the vulcanization tunnel comprised between 100 and 300° C.

According to a preferred embodiment, the temperature in the vulcanization tunnel is comprised between 150 and 250° C., still more preferably between 200 and 230° C.

The process parameters (related to the forming and vulcanizing steps) are shown in Table 3.

TABLE 3

| Forming Process | | | Vulcanization Process | | | |
| --- | --- | --- | --- | --- | --- | --- |
| Extruder thrust pressure. [bar] | Compound temperature in the extruder. [° C.] | Distance extruder outlet- vulcanization tunnel inlet. [mm]. | Speed of the conveyor belt Vulcanization Tunnel. [m/min] | Vulcanization Tunnel Temperature | | |
| | | | | Inlet area [° C.] | Central area [° C.] | Outlet area [° C.] |
| >5, <50 | >0, <50 | >10, <50 | >0.5, <2 | >100, <300 | >100, <300 | >100, <300 |

According to an embodiment, the process further comprises a step of quenching the vulcanized tubular element.

To this purpose, downstream of the vulcanization oven a quench tank can be provided, for example with length equal to about 2 m, which could receive the profile outletting the vulcanization oven in order to quench it.

Then, the profile is dipped in water at about 15° C. during the passage in the tank.

Downstream of the quench tank the profile will have reached the design size characteristic of the "cured" state and related to the temperature of 15° C. (room temperature).

At this point, according to an embodiment, a step of "dynamic" control can be provided, wherein, still with the moving profile, and relatively to the outer geometry of the produced profile, the characteristic sizes are checked and in case the process parameters are adjusted in order to return within their own geometric tolerances of the profile itself.

According to a possible embodiment, downstream of the quench tank the profile passes through the tow and reaches a winding machine.

The tow is coordinated and synchronized with the extruder, that is the thrust pressure is adjusted by managing the screw rotation speed and by the conveyor belt, that is the speed for passing through the vulcanization tunnel.

The winding machine, for example, can be managed by an operator who winds the profile by arranging it to form cylindrical coils having inner diameter of about 1 m.

A step of segmenting the tubular element into tubular segments with predefined length can be then provided.

According to a possible embodiment, the process can further comprise a step of conditioning (post-curing) the segments of tubular element.

Advantageously, such tubular segments are positioned on a resting plane of a preferably air and atmospheric pressure ventilated oven/autoclave.

Between the resting plane and the tubular segments a layer of "breather" tissue is inserted. The general profile preferably has to be arranged so as to result to be exposed to the convection and it has not to overlap on itself, so that section throttling and/or high localized stresses do not occur.

Such conditioning step further comprises a thermal conditioning characterized by:
  a heating gradient comprises between 0.5 and 10° C./min;
  a residence of about 2-8 hours at a heating temperature comprised between 50 and 300° C.;
  a quenching gradient lower than 10° C./min.

According to a possible embodiment, the heating gradient can be comprised between 0.5 and 2° C./min.

According to a possible embodiment, the residence time is about 4 hours.

According to a possible embodiment the heating temperature can be comprised between 150 and 250° C., still more preferably it can be about 205±5° C.

According to a possible embodiment, the quenching gradient can be lower than 5° C./min.

Advantageously, the process can further provide a step of closing an end of each tubular segment with a terminal cap obtained with said rubber compound.

Figure 8:
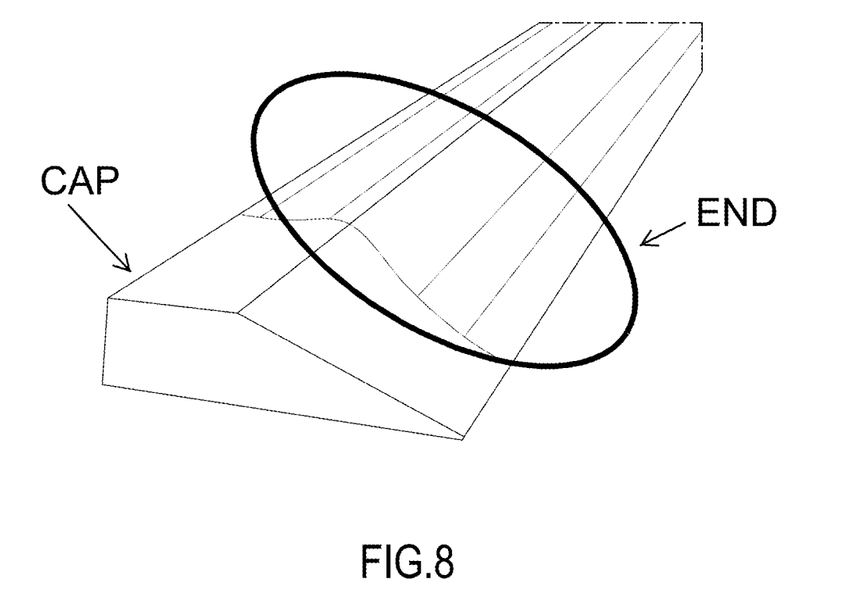
FIG. 8 shows an end of a tubular segment of the rubber profile with a cap element vulcanized and firmly glued inside the profile itself.

In this step the general tubular segment in case is cut with the purpose of obtaining a design length thereof and then an end thereof is closed up by vulcanizing and at the same time gluing (inside a mould) a cap-like closing element CAP. (FIG. 8).

Such closing step comprises the sub-steps of:
  preparing said end END;
  forming said closing cap CAP;
  vulcanizing said closing cap CAP;
  conditioning said closing cap CAP.

In turn, the preparation sub-step preferably is performed by:
  cleaning with acetone the inner area of the end END to be closed;
  abrading with 180-grain abrasive paper said inner area; and
  cleaning with acetone the abraded area.

Preferably, the profile inner area which is involved by the curing comprises a portion of about 30±5 mm measured from the end.

At this point, the cap forming takes place by moulding, after having inserted an amount of rubber compound inside the end to be closed.

Figure 9:
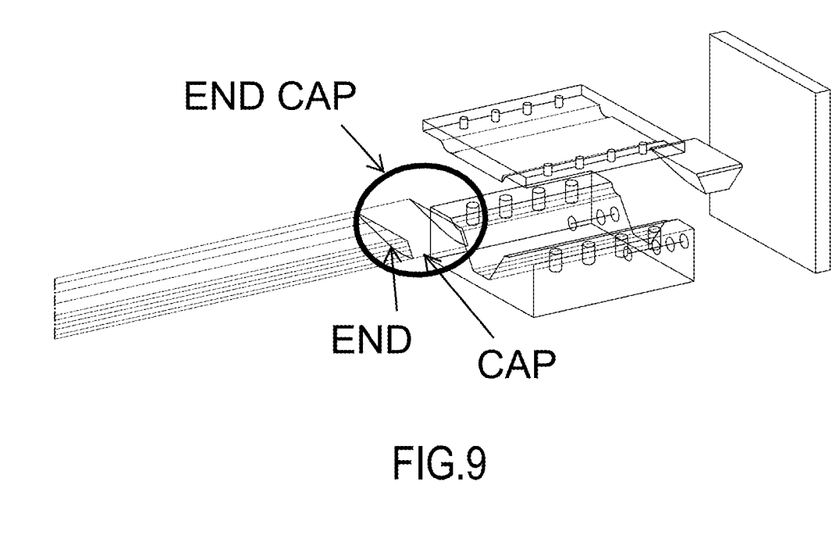
FIG. 9 is a view of a 3D model of the collapsible female L.L. mould, apt to form the cap on the rubber profile.

More in details, the profile terminal area END (the one with the inner surface prepared for gluing) is positioned inside a collapsible female L.L. mould, suitable to form the cap called "END CAP" (FIG. 9).

Such forming takes place by inserting a specific amount of compound, in the hard state, inside the area wherein the cap CAP has to be created, so that this occupies the whole inner volume of the profile END for a length of 30±5 mm and so that this creates a closed area END CAP in the terminal portion of the blank of profile made of rubber (with design shape and size deriving from the geometry of the mould itself).

Once having closed the mould during the procedure for clamping the same, the compound arranges autonomously in homogeneous way inside the volume to be filled-up by guaranteeing a perfect adhesion with all inner walls wherein the gluing has to occur and by guaranteeing the absence of cavities (air bubbles) inside the cap element.

Once having closed the mould (with the ending portion of the inserted rubber profile segment), the whole profile segment, with the mould installed at the end, is inserted in a ventilated oven with the purpose of performing the curing process as shown by the technical specifications of the compound.

In particular, the sub-step of vulcanizing said cap takes place according to the following specifications:
 a heating gradient comprised between 0.5 and 10° C./min;
 a residence of about 10-30 min at a heating temperature comprised between 50 and 300° C.;
 a quenching gradient lower than 10° C./min.

According to a possible embodiment, the heating gradient can be comprised between 0.5 and 2° C./min.

According to a possible embodiment, the residence time is about 15 min.

According to a possible embodiment the heating temperature can be comprised between 100 and 200° C., still more preferably it is about 150±5° C.

According to a possible embodiment, the quenching gradient can be lower than 5° C./min.

Once the vulcanization of the cap element has occurred, one proceeds with the post-curing (or conditioning) process. The cap-forming mould is removed and only the rubber profile area involved by the gluing thereof is inserted in a suitable oven (such oven has an opening allowing to insert the terminal portion of the profile, the one with the cap) in order to post-cure the compound which constitutes the cap itself.

The sub-step of conditioning (post-curing) the closing cap takes place according to the following specifications:
 a heating gradient comprised between 0.5 and 10° C./min;
 a residence of about 2-10 hours at a heating temperature comprised between 50 and 300° C.;
 a quenching gradient lower than 10° C./min.

According to a possible embodiment, the heating gradient can be comprised between 0.5 and 2° C./min.

According to a possible embodiment, the residence time can be comprised between 3 and 6 hours, still more preferably about 4 hours.

According to a possible embodiment, the heating temperature can be comprised between 150 and 250° C., still more preferably it is about 205±5° C.

According to a possible embodiment, the quenching gradient can be lower than 5° C./min.

The present invention has been sofar described with reference to preferred embodiments thereof. It is to be meant that each one of the technical solutions implemented in the preferred embodiments, herein described by way of example, can be advantageously combined, differently from what described, with the other ones, to produce additional embodiments, belonging to the same inventive core and however all within the protective scope of the herebelow reported claims.

The invention claimed is:

1. A process for manufacturing a tubular element made of rubber, comprising the following steps:
 (a) supplying a rubber compound to an extruder;
 (b) forming the tubular element by means of a die;
 (c) vulcanizing the tubular element formed in a vulcanization tunnel;
 (d) segmenting the tubular element in tubular segments with predefined length;
 (e) closing an end of each tubular segment with a terminal cap obtained with said rubber compound;
 (f) conditioning the segments of tubular element, wherein said tubular segments are positioned on a plane of a ventilated oven/autoclave, and wherein said conditioning step comprises a thermal conditioning characterized by:
  (i) heating, using a heating gradient between 0.5 and 10° C./minute;
  (ii) a residence of about 2-8 hours at a temperature between 50 and 300° C.; and
  (iii) quenching, using a quenching gradient lower than 10° C./minute.

2. The process according to claim 1, wherein said forming step takes place according to the following specifications:
 (a) a thrusting pressure in the extruder comprised between 5 and 50 bar;
 (b) the compound temperature in the extruder comprised between 0 and 50° C.; and
 (c) the distance between extruder die and inlet of the vulcanization tunnel between 10 and 50 mm.

3. The process according to claim 2, wherein the thrusting pressure in the extruder is between 15 and 35 bar.

4. The process according to claim 2, wherein the compound temperature in the extruder is between 10 and 35° C.

5. The process according to claim 1, wherein said vulcanization step takes place according to the following specifications:
 (a) the speed for passing in the vulcanization tunnel is between 0.5 and 2 m/minute; and
 (b) the temperature in the vulcanization tunnel is between 100 and 300° C.

6. The process according to claim 1, further comprising a step of quenching the vulcanized tubular element.

7. The process according to claim 6, wherein said quenching step provides dipping the vulcanized tubular element in water at about 15° C.

8. The process according to claim 1, wherein on said plane a layer of breather tissue is placed in advance, whereon the segments are to be arranged.

9. The process according to claim 1, wherein said heating gradient is between 0.5 and 2° C./minute.

10. The process according to claim 1, wherein said temperature in condition (ii) is about 205±5° C.

11. The process according to claim 1, wherein said quenching gradient is lower than 5° C./minute.

12. The process according to claim 1, wherein said closing step comprises the sub-steps of:
 (a) preparing said end;
 (b) forming said cap;
 (c) vulcanizing said cap; and
 (d) conditioning said cap.

13. The process according to claim 12, wherein said preparation sub-step is carried out by means of:
 (a) cleaning with acetone the inner area of the end to be closed;
 (b) abrading with 180-grain abrasive paper said inner area; and
 (c) cleaning with acetone the abraded area.

14. The process according to claim 13, wherein said inner area comprises a portion of about 30±5 cm measured from said end.

15. The process according to claim 12, wherein said cap forming takes place by molding, after having inserted an amount of rubber compound inside the end to be closed.

16. The process according to claim 12, wherein said vulcanization of said cap takes place according to the following specifications:
 (a) heating, using a heating gradient between 0.5 and 10° C./minute;
 (b) a residence of about 10-30 minutes at a temperature between 50 and 300° C.; and
 (c) quenching, using a quenching gradient lower than 10° C./minute.

17. The process according to claim 16, wherein said heating gradient is between 0.5 and 2° C./minute.

18. The process according to claim 16, wherein said temperature is about 150±5° C.

19. The process according to claim 16, wherein said quenching gradient is lower than 5° C./minute.

20. The process according to claim 12, wherein said conditioning of said cap takes place according to the following specifications:
 (a) heating, using a heating gradient between 0.5 and 10° C./minute;
 (b) a residence of about 2-10 hours at a temperature between 50 and 300° C.; and
 (c) quenching, using a quenching gradient lower than 10° C./minute.

21. The process according to claim 20, wherein said heating gradient is between 0.5 and 2° C./minute.

22. The process according to claim 20, wherein the residence time is about 4 hours.

23. The process according to claim 20, wherein said temperature in specification (b) is about 205±5° C.

24. The process according to claim 20, wherein said quenching gradient is lower than 5° C./minute.

* * * * *